Sept. 21, 1948.  C. H. DOLAN, 2D  2,449,771
LINER FOR ENGINE CYLINDERS
Filed Sept. 28, 1945
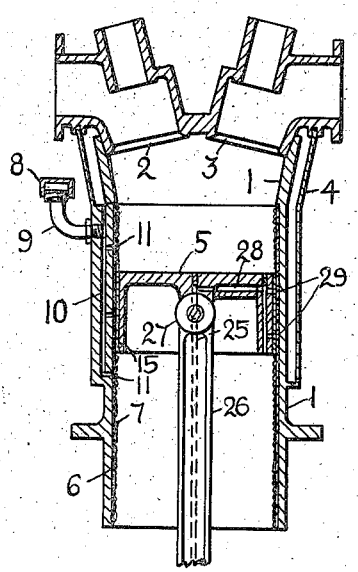
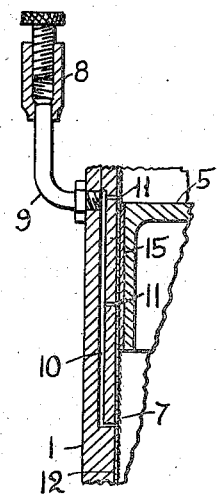
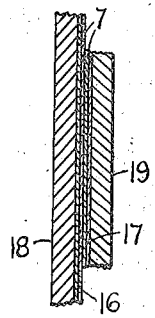
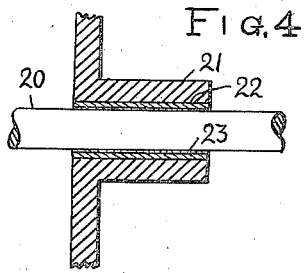
CHARLES H. DOLAN II
INVENTOR.
BY John P. Nissonow
ATTORNEY Patented Sept. 21, 1948

2,449,771

UNITED STATES PATENT OFFICE 2,449,771

LINER FOR ENGINE CYLINDERS

Charles H. Dolan, II, Old Greenwich, Conn.

Application September 28, 1945, Serial No. 619,161

9 Claims. (Cl. 309—3)

My invention relates to engine cylinders and has particular reference to cylinders for engines of different types, pumps and the like, in which the volume of the cylinder is periodically varied by reciprocating pistons.

In engine and pump cylinders in which reciprocating pistons are employed it is necessary to provide air, gas or liquid tight sealing between the piston and the cylinder bore. This is usually accomplished by providing sealing rings, fitted in corresponding peripheral grooves in the pistons. Such rings have a disadvantage in that the sealing is not perfect due mainly to the necessity for providing sufficient clearances between the ends of the rings and also between the rings and ring grooves in the piston. Moreover, the rings, because of their resilient pressure on the surface of the bore of the cylinder, tend to accelerate the normal wear of the cylinder bore.

Another disadvantage of the piston rings is that they require a relatively large amount of lubricating oil for the wearing surfaces. Such oil is often harmful, particularly with internal combustion engines, since it is apt to burn with the explosive mixture, leaving a carbon deposit and also contaminating the combustible mixture.

My invention has for its object to provide means for effectively sealing the normal working clearance between the piston and the cylinder bore without the use of piston rings. I provide for this purpose a layer or liner in the cylinder bore of a metal which is wetted by mercury and preferably, forms an amalgam therewith. Among such metals are copper, certain copper alloys, silver, etc. Mercury can be applied periodically to this layer or continuously for maintaining a thin layer of mercury amalgam. A layer of such an amalgam can be also formed on the outer cylindrical surface of the piston. I have found that such an amalgam effectively seals the clearance between the cylinder and the piston and also acts as a good lubricant so that no other lubricant may be required. The piston rings can be entirely eliminated, the amalgam, because of its high viscosity and specific weight, prevents the gases from penetrating through the clearance between the piston and the cylinder.

Oil or other neutral liquid may be also supplied to the amalgam to protect the same from oxidation if the cylinder contains oxidizing gases or liquids.

My invention is more fully described in the accompanying specification and drawings in which:

Fig. 1 is a sectional elevational view of a cylinder of an internal combustion engine with an arrangement for supplying mercury to the cylinder walls;

Fig. 2 is a fragmentary view of a cylinder wall provided with a thin line of a metal which forms an amalgam with mercury;

Fig. 3 is an enlarged detail view of two contacting objects with layers of amalgam-forming metals and layers of the amalgam;

Fig. 4 is a sectional view of a shaft in a bearing.

My internal combustion cylinder is shown in Fig. 1 and comprises a cylinder body 1 which may be of any conventional or other type, provided with valve seats 2, 3 for intake and exhaust valves and a water jacket 4. A piston 5 reciprocates in the cylinder and has a free sliding fit without any piston rings. The inner surface of the cylinder bore is heavily plated by a metal 6, such as copper, silver, etc., which readily forms an amalgam 7 with mercury.

Mercury is added from time to time from a compression cup 8 through a pipe 9 into a duct 10 extending longitudinally of the cylinder wall and provided with very small openings 11 extending into the cylinder bore. The mercury, once admitted into the cylinder, spreads out in a very thin layer over the lining, forming an amalgam.

The cylinder may be also provided with a special tubular liner 12 as shown in Fig. 2, pressed into the bore. The liner may be relatively thin and made of a suitable metal such as copper, silver, etc., which forms an amalgam with mercury.

The piston 5 may be also provided with a lining or outer layer 15 of a metal which readily forms an amalgam with mercury, such as copper, silver, etc.

I have found that the mercury amalgam effectively seals the clearance between the cylinder and the piston even when this clearance is sufficiently large to allow for large temperature variations such as are usually encountered in internal combustion engines. The amalgam, because of its high viscosity and relatively heavy specific weight, strongly resists being blown out by pressure of gases in the cylinder so that a satisfactory operation of the engine cylinders is obtained with pistons having proper clearances and without any piston rings.

My invention can be also applied to cylinders of reciprocating pumps and similar apparatus. It can be also used with any relatively movable contacting surfaces in which lubrication is required together with a perfect seal against gas or steam leakage as, for instance, in valves of various types, such as slide valves, gate valves, etc. Fig. 3 shows such layers 16, 17 between relatively movable plates 18, 19.

Another useful application of my invention is in connection with sealing and lubrication of rotating shafts as, for instance, in steam or gas turbines, rotary pumps, piston rods for double acting cylinders, etc. The usual packing can be dispensed with when my arrangement is used, the rod 20 moving or rotating in a bearing 21 with a liner 22 inside, coated with an amalgam 23. The rod can be also provided with a layer or coat of an amalgam-forming metal. Means may be provided for supplying mercury to the contacting surfaces, periodically or continuously, as by means of a suitable compression cup, periodically operated pump, etc.

If the cylinder contains an oxidizing atmosphere or medium, the mercury or amalgam may be protected from oxidation by a small amount of oil or other neutral liquid covering the surface of the amalgam with a thin film, sufficient only for the protection against corrosion. The oil may be fed through a hole 25 in a piston rod 26, the oil being supplied by an ordinary oil feeding system. The oil from a bearing 27 is delivered through a duct 28 and small holes 29 to the outer surface of the piston 5.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A cylinder for an engine or the like, comprising a tubular insert in the bore of the cylinder, the insert being made of a metal capable of forming an amalgam with mercury, and a layer of mercury adhering to the surface of the tubular insert.

2. A cylinder for an engine or the like, the surface of the cylinder in the bore being of a metal capable of forming an amalgam with mercury, and means to supply mercury to the surface of the cylinder in the bore.

3. A cylinder for an engine or the like comprising a tubular insert in its bore, the insert being made of a metal capable of forming an amalgam with mercury; a layer of mercury on the inner surface of the insert, the insert having a plurality of openings in communication with a common channel in the wall of the cylinder; and means to supply mercury to the lining through the openings.

4. A cylinder for an engine or the like comprising a tubular insert in its bore, the insert being made of a metal capable of forming an amalgam with mercury; a layer of mercury on the inner surface of the insert, the insert having a plurality of openings in communication with a common channel in the wall of the cylinder; a tube extending from the common channel to the outside; and a compression cup at the end of the tube for forcing mercury into the cylinder through the channel and openings.

5. An engine or the like comprising a cylinder, the inner surface portion of the cylinder being made of a metal capable of forming an amalgam with mercury; a layer of mercury adhering to the inner cylindrical surface of the cylinder; a piston slidably fitted in the cylinder, the outer surface portion of the piston being made of a metal capable of forming an amalgam with mercury; and a layer of mercury adhering to the outer cylindrical surface of the piston.

6. An arrangement to lubricate and to seal a clearance between two objects in a close contact with each other, at least one of the contacting surfaces being made of metal capable of being wetted by mercury, said arrangement comprising a layer of mercury on the contacting surface made of a metal wettable by mercury; and means to supply mercury to the metal layer.

7. A cylinder for an engine or the like, the surface of the cylinder in the bore being of a metal capable of forming an amalgam with mercury, means to supply mercury to the surface of the cylinder in the bore; and means to protect the surface of the amalgam from oxidation.

8. A cylinder for an engine or the like, the surface of the cylinder in the bore being of a metal capable of forming an amalgam with mercury, means to supply mercury to the surface of the cylinder in the bore; and means to supply a neutral liquid to the surface of the amalgam for its protection against oxidation.

9. A cylinder for an engine or the like, the inner surface of the cylinder being made of a metal capable of forming an amalgam with mercury, and a layer of mercury adhering to the inner surface of the cylinder.

CHARLES H. DOLAN, II.

REFERENCES CITED

The following references are of record in the file of this patent:

UNITED STATES PATENTS

| Number | Name | Date |
| --- | --- | --- |
| 1,329,348 | Copeland | Jan. 27, 1920 |
| 1,466,432 | Gerleman | Aug. 28, 1923 |
| 1,544,488 | Sherwood | June 30, 1925 |
| 1,598,321 | Sherwood | Aug. 31, 1926 |